US008545787B2

(12) United States Patent
Pruett et al.

(10) Patent No.: US 8,545,787 B2
(45) Date of Patent: Oct. 1, 2013

(54) METHOD OF TREATING AN AQUEOUS SUSPENSION OF KAOLIN

(75) Inventors: Robert J. Pruett, Milledgeville, GA (US); Jim Richardson, Milledgeville, GA (US); William Limousin, Larmor Plage France (FR); Ismail Yildirim, Milledgeville, GA (US); Jun Yuan, Kathleen, GA (US)

(73) Assignee: Imerys Pigments, Inc., Roswell, GA (US)

( * ) Notice: Subject to any disclaimer, the term of this patent is extended or adjusted under 35 U.S.C. 154(b) by 325 days.

(21) Appl. No.: 12/278,363

(22) PCT Filed: Feb. 7, 2007

(86) PCT No.: PCT/US2007/003110
§ 371 (c)(1),
(2), (4) Date: Dec. 4, 2008

(87) PCT Pub. No.: WO2007/092421
PCT Pub. Date: Aug. 16, 2007

(65) Prior Publication Data
US 2009/0317318 A1    Dec. 24, 2009

Related U.S. Application Data (60) Provisional application No. 60/765,719, filed on Feb. 7, 2006.

(51) Int. Cl.
| C01B 33/26 | (2006.01) |
| B03D 3/06 | (2006.01) |
| B03B 9/06 | (2006.01) |
| C04B 14/04 | (2006.01) |
| C02F 1/52 | (2006.01) |

(52) U.S. Cl.
USPC .............. 423/327.1; 209/11; 209/5; 106/486; 210/732

(58) Field of Classification Search
None
See application file for complete search history.

(56) References Cited

U.S. PATENT DOCUMENTS

| 2,470,142 A | * | 5/1949 | Chapman et al. ............. 502/238 |
| 3,655,038 A | | 4/1972 | Mercade | |

(Continued)

FOREIGN PATENT DOCUMENTS

| EP | 0 591 406 A1 | 1/1993 |
| WO | WO 98/50161 A1 | 11/1998 |

(Continued)

OTHER PUBLICATIONS

Search Report and Written Opinion for related International Application No. PCT/US2007/003110.

Primary Examiner — Bijay Saha
(74) Attorney, Agent, or Firm — Finnegan, Henderson, Farabow, Garrett & Dunner, L.L.P.

(57) ABSTRACT

A method of treating a kaolin particulate material to improve one or more of its properties by removal of impurity particles therein which includes: producing a dispersed aqueous suspension of a kaolin particulate material containing at least 0.1% by weight, based on the dry weight of the kaolin particulate material of separable particulate impurity; diluting said dispersed aqueous suspension by adding a diluent thereto; adding a selective flocculation polymer to the diluted suspension; allowing the suspension containing the polymer to separate in a selective flocculation separator into layers comprising a flocculated product layer and a deflocculated impurity layer containing the separable impurity; and extracting the separated layers from the separator, wherein at least a portion of said deflocculated impurity layer is recirculated for use as at least a portion of the aforementioned diluent.

33 Claims, 5 Drawing Sheets

(56) References Cited

U.S. PATENT DOCUMENTS

| | | |
|---|---|---|
| 3,701,417 A | 10/1972 | Mercade |
| 4,018,673 A | 4/1977 | Hughes et al. |
| 4,227,920 A | 10/1980 | Chapman et al. |
| 4,472,271 A | 9/1984 | Bacon, Jr. |
| 4,650,521 A | 3/1987 | Koppelman et al. |
| 5,535,890 A | 7/1996 | Behl et al. |
| 5,685,900 A | 11/1997 | Yuan et al. |
| 6,615,987 B1 * | 9/2003 | Greenhill et al. ............ 209/5 |
| 7,626,067 B2 * | 12/2009 | Van Egmond et al. ....... 585/640 |
| 2006/0131243 A1 * | 6/2006 | Garska et al. ............... 210/732 |

FOREIGN PATENT DOCUMENTS

| | | |
|---|---|---|
| WO | WO 98/57888 A1 | 12/1998 |
| WO | WO 2007/092421 A2 | 8/2007 |

* cited by examiner

METHOD OF TREATING AN AQUEOUS SUSPENSION OF KAOLIN

CLAIM OF PRIORITY

This application is a U.S. national stage entry of, and claims the benefit of priority to, PCT International Application No. PCT/US2007/003110 filed Feb. 7, 2007, and also claims the benefit of priority to U.S. Provisional Patent Application No. 60/765,719 filed Feb. 7, 2006, both of which are incorporated by reference herein in their entireties.

BACKGROUND OF THE INVENTION (a) Field of the Invention

The present invention relates to a method of treating an aqueous suspension of kaolin to separate impurities therefrom, e.g. to improve the brightness and other properties of the kaolin. The method involves the process of selective flocculation.

Kaolin or kaolinitic clay is a mineral clay containing the particulate mineral kaolinite as its principal constituent. Such clays were formed in geological times by the weathering of the feldspar component of granite. Primary kaolin clays are those which are found in deposits at the site at which they were formed, and are generally present in a matrix of undercomposed granite which must be separated from the clay during the refining process for the clay. For example, kaolin clays mainly of the primary type are obtained from deposits in South West England, France, Germany, Spain and the Czech Republic. Secondary kaolin clays, which are alternatively known as sedimentary kaolin clays, are those which were flushed out in geological times from the granite matrix in which they were formed, and were deposited in an area remote from their site of formation, generally in a basin formed in the surrounding strata. For example kaolin clays obtained from deposits in Georgia, South Carolina and Alabama, USA are generally of the sedimentary (secondary) type, as are kaolin clays obtained from deposits in Brazil.

Kaolin clay is refined and used as an ingredient, pigment or filler material in a variety of application compositions, especially for filling and coating of paper, paper board and like products. Kaolin is a white mineral and is often used in such application compositions to impart, amongst other things, whiteness and brightness. However, one or more desirable properties of the kaolin may be adversely affected by the presence of impurities. Kaolin clays are generally found in association with impurities which are often present in relatively small proportions. The composition and nature of the impurities can vary considerably, depending on the geographical region from which the kaolin clay is obtained. The impurities present can significantly affect the properties of the kaolin clay.

The present invention is concerned with treating kaolin clays containing separable impurities therein, especially impurities which comprise particles which are finer than 1 μm in size, to reduce the amount of such impurities which are present.

A particular impurity which where present in kaolin is often desirable to remove is titanium, e.g. present as titania. This impurity is colored and its presence adversely affects the whiteness and brightness of the kaolin. The titania often contains at least a small percentage of associated iron oxide which either stains the surface of the titania crystals or acts as a substituent in the titania lattice. It is the colored iron oxide associated with but not easily separable from the titania which principally causes the unwanted whiteness and brightness reduction. Titania impurity is found mainly in sedimentary kaolins, e.g. from South East USA, and it is often desirable to remove this impurity from such kaolins.

Titania itself is potentially useful as an opacifying agent. Thus, it would be potentially advantageous to concentrate and collect the titania impurity while simultaneously removing it from the kaolin.

Other impurities, such as quartz, mica, phosphates, fine clay impurities such as certain smectite clay constituents and various other species, e.g. compounds containing transition elements such as iron, may also be present and may be undesirable in many kaolin product applications. In general, such impurities may be found in either primary or sedimentary kaolin clays. However, the nature and amount of the impurity types present will vary between clay types.

(b) Prior Art

Improving the properties of kaolin clays, especially the whiteness and brightness of kaolin clays by the separation therefrom of separable impurities especially titania and iron oxide associated with the titania, has been a major problem facing the kaolin industry in the prior art. Many attempts have been made to solve this problem but none has been entirely satisfactory.

Certain physical beneficiation processes such as magnetic separation (e.g. as described in WO9850161A) and particle size classification, e.g. by centrifuging (e.g. as described in U.S. Pat. No. 4,018,673), have been applied. These are effective for separation of impurities which are not fine, e.g. having a particle size substantially greater than 1 μm, but are not effective for separating fine impurities, e.g. having a particle size less than 1 μm, from kaolin clays.

Various chemical beneficiation methods have been proposed in the prior art for employment to separate fine impurities, especially discoloring titania impurities, from kaolin clays to improve their properties such as their brightness. For example, for this purpose flotation has been described in U.S. Pat. No. 3,655,038, froth flotation has been described in U.S. Pat. No. 4,472,271 and EP-A-591406 and leaching has been described in U.S. Pat. No. 4,650,521. Substantial industrial use has been made of froth flotation. However, this process can be expensive to operate and may not be adequately effective when applied to kaolin clays containing a significant amount of fine particles, e.g. having a size less than 1 μm.

Selective flocculation has been described in the prior art for separation of impurities such as titania from kaolin, e.g. as described in U.S. Pat. No. 3,701,417, WO98/57888, U.S. Pat. Nos. 5,685,900, 5,535,890 and 4,227,920. In U.S. Pat. No. 3,701,417 and WO98/57888 the process described is of a kind operated under conditions such that the titania and other impurities are separated in a flocculated layer and the product is recovered from a deflocculated layer. In the other references the titania and other impurities are separated in a deflocculated layer.

Separating the titania in a flocculated lower layer or so called underflow layer is not fundamentally an efficient process because a significant amount of kaolinite, e.g. 20% or more, typically 30% to 45% by weight, of the feed material becomes entrained with the impurity, e.g. titania. Separating the impurity in a deflocculated layer is much more efficient, e.g. the amount of kaolinite present in the impurity layer can be small, e.g. at most a few percent by weight. A selective flocculation process of this type is described in U.S. Pat. No. 6,615,987. The process described in U.S. Pat. No. 6,615,987 results in a waste stream which is somewhat enriched in titania. However, it would be beneficial to further enrich the titania content of the waste stream, both to reduce the amount of water used in the selective flocculation process and to increase the potential for recovery of a high titania product from the waste stream.

SUMMARY OF THE PRESENT INVENTION

According to the present invention there is provided a method of treating a kaolin particulate material to improve its properties by removal of impurities which includes:
(a) producing a dispersed aqueous suspension of a kaolin particulate material containing at least 0.1% by weight, based on the dry weight of the kaolin particulate material of separable particulate impurity;
(b) diluting said dispersed aqueous suspension by adding a diluent thereto;
(c) adding a selective flocculation polymer to the diluted suspension;
(d) allowing the suspension containing the polymer added in (c) to separate in a selective flocculation separator into layers comprising a flocculated product layer and a deflocculated impurity layer containing the separable impurity; and
(e) extracting the separated layers from the separator, wherein at least a portion of said deflocculated impurity layer is recirculated for use as at least a portion of the diluent in (b).

The dispersed aqueous suspension of (a) may have a solids content of at least about 25% by weight, such as for example at least about 30%, at least about 35%. For example, the solids content of the dispersed aqueous dispension of (a) may range from about 30% to about 40% by weight, or may alternatively range from about 40% to about 70% by weight.

The diluting in (b) may include adding a diluent to the aqueous suspension to adjust the solids content of the suspension to, for example, from about 5% to about 15% by weight.

In one aspect, at least about 5% of said deflocculated impurity layer is recirculated for use as at least a portion of the diluent in (b). For example, from about 15% to about 70%, or from about 30% to about 60% of said deflocculated impurity layer may be recirculated for use as at least a portion of the diluent in (b).

The deflocculated impurity layer has a titania content of at least about 15% by weight, e.g. greater than about 20% by weight, e.g. greater than about 25% weight, e.g. greater than about 30% by weight, e.g. greater than about 40% by weight.

The kaolin particulate material may contain at least 0.2% by weight of separable fine particulate impurity, based on the dry weight of the kaolin.

The feed kaolin clay treated by the method of the invention may contain at least 0.5% by weight, in many cases at least 1.0% by weight, in some cases at least 1.5% by weight, based on the dry weight of the kaolin, of impurity to be reduced in content by separation, e.g. $TiO_2$. The $TiO_2$ if present may comprise the anatase and/or rutile form of $TiO_2$. At least 20% by weight, e.g. 30% to 40% by weight or more, preferably at least 50% by weight, of separable $TiO_2$ present in the feed kaolin may be separated from the feed kaolin by the method of the invention. Further $TiO_2$ content and other impurities may be separated by other conventional beneficiation processes, e.g. applied after the selective flocculation separation process.

At least 95%, in many cases at least 97%, by weight of the kaolinite present in the aqueous suspension in (a) may be separated and recovered from the flocculated product layer in (e) in the method of the invention.

Other undesirable impurities, especially fine impurities, associated with kaolin, such as one or more of mica, feldspar, silicates such as quartz, clay mineral impurities such as smectites and other kandites, phosphates and metal oxides, e.g. of iron and other transition metals, may, alternatively or in addition to titania, be separated by the method of the invention either used alone or in conjunction with one or more other known beneficiation processes.

Other beneficiation processes, which may be applied after selective flocculation, may comprise one or more of oxidation, particle size classification, comminution e.g. by grinding using particulate grinding media, magnetic separation, bleaching and dewatering.

The kaolin treated by the method of the invention may comprise a coarse crude kaolin clay having a (water washed) GE brightness of less than 70, e.g. in the range of from 20 to 70, although kaolins having a GE brightness of greater than 70 may also be treated by the method.

The method of the invention may be operated as a batch, semi-continuous or continuous process.

DESCRIPTION OF THE INVENTION

The starting material for the method of the invention may comprise a substantially dry, crude kaolin clay. This may be treated by adding water and dispersant (dispersing agent) thereto to produce the dispersed aqueous suspension of (a). Mechanical working, e.g. by blunging, is preferably applied to the aqueous suspension produced in (a), whereby agglomerates present in the kaolin are broken down by the working process. The working process is desirably carried out before conditioning (b) and may be applied during (a). Addition of dispersant and application of working may be applied together, in a batch, semi-continuous or continuous process.

Suitable dispersants for the particles of the suspension which may be added thereto in (a) include the anionic dispersants which have previously been employed in the prior art, especially in a deflocculation/selective flocculation separation process. For example, the dispersant may comprise an inorganic agent such as an alkali metal silicate, e.g. sodium silicate or potassium silicate, or a condensed phosphate salt such as sodium hexametaphosphate or sodium pyrophosphate. Alternatively, or in addition, the dispersant may comprise an organic agent such as a lignosulfonate, e.g. sodium lignosulfonate, or a polycarboxylate, e.g. a polyacrylate such as a sodium polyacrylate.

In one embodiment of the invention, a suitable dispersant composition for addition to the aqueous suspension comprises an inorganic agent, e.g. a condensed phosphate salt, added in (a), and a polycarboxylate, e.g. a polyacrylate, of low molecular weight (weight average molecular weight<20,000) added in (a) or later (as conditioning chemical if added in (b)

after mechanical working). The expression 'polyacrylate' in this specification includes copolymers, known in the art, of acrylic acid with other monomers, e.g. maleic acid or methacrylic acid. In such copolymers, the acrylic acid units may provide at least 50% of the polymer by weight. In such a dispersant composition, the weight ratio (on a dry weight or 'active' basis) of inorganic agent to polycarboxylate may for example be x:1 where x is greater than 1. In such a ratio x may be at least 2.0, e.g. 2.0 to 5.0.

The inorganic agent, e.g. of the said composition, may comprise sodium hexametaphosphate and the polycarboxylate may comprise sodium polyacrylate.

The dispersed aqueous suspension is preferably treated by the mechanical working process at a particle solids concentration of at least about 30%, e.g. at least 40%, particularly at least 50%, in some cases at least 60%, or even 70% or more by weight. A work input of at least 5 $kJ.kg^{-1}$, preferably at least 15 $kJ.kg^{-1}$, e.g. from 20 $kJ.kg^{-1}$ to 100 $kJ.kg^{-1}$, may be applied during the mechanical working process.

Following (a), including any mechanical working applied, the suspension may optionally be diluted and degritted to remove large particles still present.

The pH of the aqueous suspension is preferably adjusted prior to (b), e.g. during (a). The pH may be adjusted to be 6.5 or more, e.g. from 6.5 to 9.5 or more, especially from 6.5 to 7.5, prior to (b). The pH may be adjusted prior to (b) and again later to a higher value. The later pH adjustment may be carried out by adding one or more suitable basic substances, e.g. selected from alkali metal hydroxides and carbonates and ammonium hydroxides and carbonates, such as sodium hydroxide, potassium hydroxide, sodium carbonate or ammonium hydroxide. We prefer to use sodium hydroxide as pH adjusting additive.

A conditioning step and pH adjustment step may optionally be applied before addition to the suspension of the selective flocculation polymer in (c) to improve the size and strength of the flocs which are produced after the selective flocculation polymer has been added and thereby improve the effectiveness and efficiency of the separation process, i.e. separation of kaolinite flocs from deflocculated impurities.

An conditioning by ageing step may optionally be carried out for a period of at least about 30 minutes, usually at least 2 hours, prior to the selective flocculation polymer addition in (c). Ageing for a period of at least 5 hours, e.g. at least 8 to 24 hours, especially for a period of 1 to 7 days, prior to selective flocculation polymer addition, is particularly beneficial.

Where the conditioning includes in addition to ageing the addition of a conditioning chemical, the conditioning chemical is desirably added prior to ageing. The conditioning chemical may however be added after some or all of the ageing. The conditioning chemical may for example comprise one or more salts of a monovalent ion metal, e.g. one or more sodium salts. The sodium salt(s) may comprise an organic salt, such as a salt of a polycarboxylate, or a halide. Sodium chloride is preferred as halide. Sodium polyacrylate is preferred as polycarboxylate. Sodium polyacrylate, where employed, may be one of the commercially available products employed as mineral dispersants.

The conditioning chemical(s) may optionally be added to the kaolin suspension via one or more static in-line mixers. Alternatively, the chemical(s) can be added to the kaolin suspension in one or more conventional mixers using mechanical agitation means to ensure good mixing.

Preferably, during the conditioning by ageing, especially if the suspension contains one or more conditioning chemicals, the suspension is mechanically agitated, e.g. by stirring or recirculation. Such agitation may be light and may be applied continuously, semi-continuously or intermittently.

The selective flocculation polymer added in (c) is conveniently mixed with the kaolin suspension prior to delivery of the mixture of the two to the selective flocculation separator. Conveniently these two ingredients are thoroughly mixed together prior to delivery to the separator. The selective flocculation polymer may be added via one or more static in-line mixers. Alternatively the selective flocculation polymer can be added to the kaolin suspension in one or more conventional mixers using conventional mechanical agitation means to ensure good mixing.

The selective flocculation polymer may be added in one or more doses at one or more addition points prior to delivery of the suspension to the separator.

The feed aqueous suspension to be delivered to the selective flocculation separator may have a specific gravity in the range of from 1.03 to 1.15. The solids content of the suspension may accordingly be in the range 5% to 21%, e.g. 10% to 15%, by weight. Dilution with water may be carried out before the delivery to the separator, desirably before addition of the selective flocculation polymer. In one aspect, at least a portion of the dilution is accomplished by addition of a recirculation stream from a later step, as will be discussed below.

The feed aqueous suspension to be delivered to the selective flocculation separator, e.g. after mechanical working and subsequent conditioning and prior to selective flocculation polymer addition, may beneficially be heated, e.g. by use of hot water in a water dilution stage and/or by passage of the suspension through an external heater, e.g. a heating jacket of a heat exchanger, e.g. to raise the temperature by at least 10° C., e.g. from about 15-20° C. to about 30-35° C. or more.

The polymer added in (c) of the method of the invention may be one of the selective flocculation polymers previously known or used in the art to flocculate kaolinite but to leave impurities deflocculated. The organic polymers useful as the selective flocculation polymer in carrying out the method of the invention include water-soluble weakly anionic organic polyelectrolytes having an average molecular weight greater than about 10,000, especially greater than about 100,000, in many cases greater than about 1,000,000. Weakly anionic polymers may contain both anionic and non-ionic groups. Anionic properties may be imparted to synthetic non-ionic organic polymers for example by the presence of side chains of anionic groups, such as carboxylic acid, carboxylic anhydride and carboxylic acid salt groups. Non-ionic groups in a side chain in the polymer may also be present resulting from the presence of certain hydrophilic groups, e.g. one or more of the following hydrophilic groups: carboxylic acid amide, carboxy alkyl ester, pyrrolidone, hydroxy, hydroxy alkyl ether and alkoxy. Because of their commercial availability high molecular weight weakly anionic synthetic polymers such as polyacrylamides containing some replacement, e.g. from 1% to 20% by weight, often from 1% to 15% by weight, especially from 1% to 10% by weight, further from 5% to 10% by weight, even further from 7% to 8% by weight of amide groups by carboxylic groups are suitable. Such polyelectrolytes are prepared by copolymerization of the non-ionic monomer(s), e.g. acrylamide, and one or more suitable carboxylic acids, e.g. acrylic acid, or by the partial hydrolysis of non-ionic polymer(s), e.g. polyacrylamide.

The concentration of the polymer in the suspension in (d) of the method of the invention may be in the range of from 0.001% to 0.5%, preferably from 0.05% to 0.5% by weight based on the dry weight of kaolin present.

The specific gravity of the overflow or deflocculated impurity-containing aqueous layer produced by separation from kaolinite in the selective flocculation process in (d) of the method according to the invention may be about 1.001 or more, e.g. in the range 1.001 to 1.03. Adjustment of the specific gravity may be made by adjustment of the dose of the selective flocculation polymer added to the suspension to be treated.

Following formation of the layers in (d), the layer of deflocculated impurities may be separated from the layer of flocculated kaolin particles in (e) by conventional means, e.g. elutriation, decanting or siphoning using batch operation or in a continuous separator. After extraction, at least a portion of the layer of deflocculated impurities may be recirculated for use as a diluent to reduce the solids content of the feed stream. The remainder of the extracted deflocculated impurity layer stream may be disposed of as waste. Alternatively, a portion of the deflocculated impurity layer stream can be subjected to further processing to concentrate and recover the titania impurity as a secondary product.

In one aspect, at least about 5% of the extracted deflocculated impurity stream may be recirculated as diluent, e.g. at least about 15%, e.g. at least about 30%, e.g. at least about 40%, e.g. at least about 50%. In some embodiments as much as about 70% of the extracted deflocculated impurity stream can be recirculated, e.g. from about 30% to about 70%, e.g. about 35% to about 50%.

In addition to the extracted deflocculated impurity stream, additional dilution may be obtained by adding fresh water or another other process stream from elsewhere in the plant. Such additional diluent can be either added separately to the feed stream to be diluted, or can alternatively be combined with the recirculated extracted deflocculated impurity stream prior to dilution.

Recirculation serves to further concentrate the impurity in the extracted deflocculated impurity stream, while not significantly degrading the quality and quantity of the kaolin product. In addition, the water and volume based process chemical consumption of the selective flocculation process may be greatly reduced, providing both environmental and economic advantages.

The flocculated kaolin suspension extracted in (e) may be further treated in a known manner, e.g. by optional high shear pumping or mixing to break up the flocs followed by one or more further beneficiation processes, e.g. one or more of oxidation, comminution, e.g. grinding, particle size classification, e.g. screening and/or centrifugation, magnetic separation, bleaching, washing, and dewatering, e.g. spray drying. Preferably, after separation of the flocculated kaolin product suspension and before further processing of the same, the pH of the flocculated kaolin product suspension is reduced in a well known way by adding an acidic substance, e.g. to about 7 or less.

Prior to or during further processing, the flocculated kaolin suspension extracted in (e) may be further treated in another selective flocculation step applied to provide further purification of the kaolin. For example, the suspension obtained may be cleaned by washing with clean water, and treated by repeating one or more of the steps previously applied prior to polymer addition. Further selective flocculation polymer, which may be the same as or different from that employed in the earlier (c) may then be added at the appropriate stage. The suspension is again allowed to separate in a selective flocculation separator and the respective layers formed are subsequently extracted as in the earlier selective flocculation and extraction steps (d) and (e).

The kaolin suspension treated in the method of the invention and extracted as the product layer in (e) may, optionally following a treatment step to break down the flocs therein, beneficially be treated by an oxidizing agent to oxidize residual polymers and other oxidizable impurities present in the suspension following the selective flocculation process(es).

The oxidizing agent may comprise ozone applied to the separated kaolin product suspension in a conventional ozonizer, e.g. in gaseous form, bubbled into the suspension.

The separated and extracted impurity-containing deflocculated material may be discarded or further treated to recover, purify and use ingredients therein, e.g. $TiO_2$. Water in the material may be separated by dewatering and may be purified and recycled for re-use in the same process or in a different process in a known manner.

As described earlier, the resulting kaolin optionally after further processing steps, may show properties superior to those obtained by comparable prior art processes. The resulting kaolin may for example have the following product properties:
  % residual $TiO_2$: <0.7% by weight (based on the dry weight of kaolin);
  GE brightness: at least 88, preferably at least 91.

Although the invention is effective in treating kaolin-containing inorganic particulate materials having a wide range of particle size properties, it is particularly suitable for producing fine materials suitable for use as pigments in paper products. For example, the product produced may have the following properties:
  mean particle size: from 0.2 μm to 5 μm, e.g. from 0.2 μm to 1.5 μm;
  percentage (by weight) of particles having a size less than 2 μm: at least 60%, in some cases at least 80%, preferably for very fine clays at least 90% by weight;

In this specification, titania and iron oxide amounts are as measured by a Philips Minimate™ GXPS1 analyzer fitted with a 10 kV/0.15 mA Sn X-ray source using approximately 1 g of dried and milled powder for the measurement.

In this specification, particle size (equivalent spherical diameter) distribution and mean size measurements are as measured in a well known manner by sedimentation of a fully dispersed dilute suspension of the particles in a standard aqueous medium using a SEDIGRAPH™ 5100 machine supplied by Micromeritics Corporation.

All brightness values referred to herein are as measured according to the standard method laid down in TAPPI procedure T-646 05-75.

Embodiments of the present invention will now be described by way of example with reference to FIG. 1. In the following description, percentage by weight values given for additives are, unless otherwise stated, percentages by weight of dry or active amounts of the additives based upon the dry weight of the inorganic particulate material present in the treated suspension.

Figure 1:
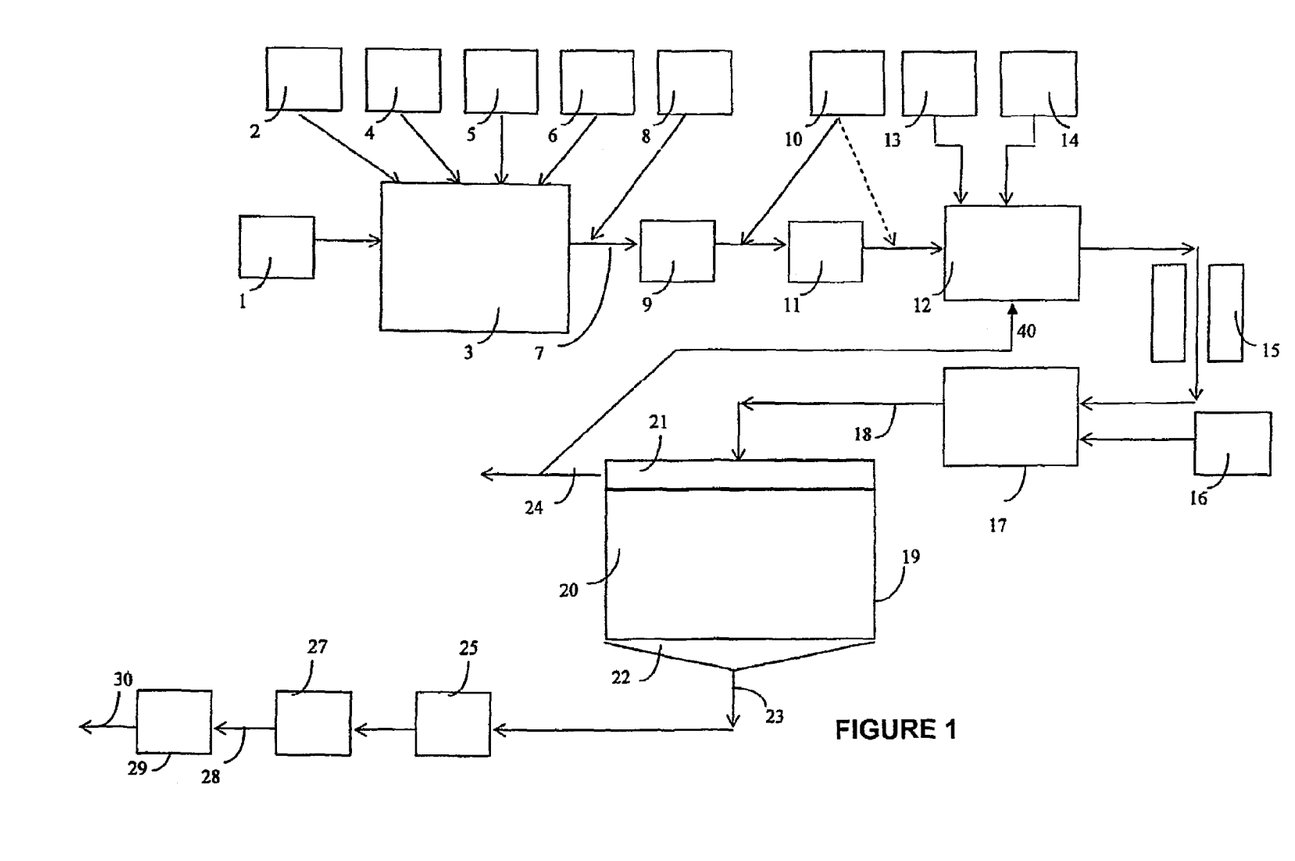
FIG. 1 is a diagrammatic flow sheet of a method of treating an aqueous kaolin suspension in accordance with an embodiment of the invention.

In one aspect, as seen in FIG. 1, crude, particulate kaolin obtained from Georgia, USA is delivered as a substantially dry solid material from a source 1 together with water from a source 2 to a blunger 3. An aqueous suspension having a solids content of at least about 25%, e.g. at least about 30%, e.g. eat least about 35%, e.g. from 40% to 70% or more by weight, is formed in the blunger 3. The following ingredients are also added to the suspension being treated in the blunger 3:
  (a) inorganic dispersant, e.g. sodium hexametaphosphate, from a source 4;
  (b) alkali, e.g. sodium hydroxide or sodium carbonate, from a source 5; and
  (c) optionally organic polyelectrolyte dispersant, e.g. sodium polyacrylate, from a source 6.

The materials from the sources 1, 2, 4, 5 and 6 are thoroughly mixed and worked together in the blunger 3. Mechanical working of the aqueous suspension of kaolin in the blunger 3 is applied to break down agglomerates of solid particles. The resulting dispersed suspension has a pH of about 6.5-7. An output stream 7 comprising the dispersed suspension after treatment in the blunger 3 is supplied, optionally after dilution with water from a source 8, to a degritter 9 where large particles, are separated and removed. Conditioning chemical, e.g. a sodium halide and/or a sodium polycarboxylate, may optionally be added from a source 10. The degritted kaolin suspension is then optionally delivered to a conditioning tank 11 where the suspension is allowed to stand with gentle mechanical stirring for an ageing period, e.g. for at least 30 minutes, preferably for several hours or days. After conditioning by ageing, further optional conditioning chemical may be added (in addition to or instead of that applied prior to ageing) from the chemical additive source 10. The suspension is delivered to a mixer 12. The suspension may optionally be diluted by addition of water from a source 13 to adjust the specific gravity of the suspension. The pH of the suspension may be adjusted to be at least 9.5 by addition of alkali such as sodium hydroxide or sodium carbonate from a source 14. An output stream from the mixer 12 consists of the kaolin suspension plus additives having a low solids concentration for example of from 10% to 15% by weight and a preferably pH of at least 9.5. The suspension is optionally passed through a heater 15 (e.g. a heat exchanger) which heats the suspension to a temperature of about 30° C.-40° C. A stream of the suspension optionally heated by the heater 15 is delivered to a mixer 17 where selective flocculation polymer consisting of a high molecular weight polyacrylamide having less than about 15% by weight of anionic groups is added from a source 16. The output of the mixer 17 is a stream 18 of the suspension which is delivered as a feed to a separator 19 in which separation of kaolinite from impurities by selective flocculation takes place. Following this separation, a flocculated underflow layer 20 and a deflocculated overflow layer 21 are formed. A product stream 23 from the underflow layer 20 comprising beneficiated kaolin flocs is collected from the separator 19 at its base 22. A waste stream 24 comprising deflocculated impurities separated by the selective flocculation process in the overflow layer 21 is extracted from an upper region of the separator 19.

A portion of waste stream 24 may be removed as recirculation stream 40 and used for dilution of output stream 7. For example, in one aspect, recirculation stream 40 is directed to mixer 12 as a diluent. Additional dilution may also be provided by adding water from source 13, as previously described. In one aspect, output stream 7 is diluted to a solids content of about 5% to about 20% by weight, e.g. about 5% to about 15% by weight.

The suspension of kaolin in the product stream 23 is passed, optionally after shearing of the flocs therein by a shearing device 25, through an ozonizer 27 in which ozone gas is applied thereto. The concentration of ozone employed may be as in the prior art, e.g. from 0.01% to 0.05% by weight. The ozone breaks down residual polymer and other oxidizable impurities, e.g. organic coloring contaminants, present in the suspension. An output stream 28 from the ozonizer 27 is delivered to a plant 29 in which the beneficiated kaolin suspension is further treated by conventional processing steps as described earlier to produce a commercially acceptable pigment product 30 available in dry or slurry form as required, e.g. having the properties described earlier.

Examples of the treatment of kaolin suspensions or slurries using the method embodying the invention illustrated in FIG. 1 as well as comparative prior art methods are as follows. In each of these Examples, where a percentage value of an additive or ingredient is stated this is the percentage by weight on a dry or active basis based on the dry weight of kaolin present in the slurry.

PROPHETIC EXAMPLES

The following are hypothetical examples demonstrating the improvements anticipated to be achievable by implementing aspects of the present invention.

Figure 2:
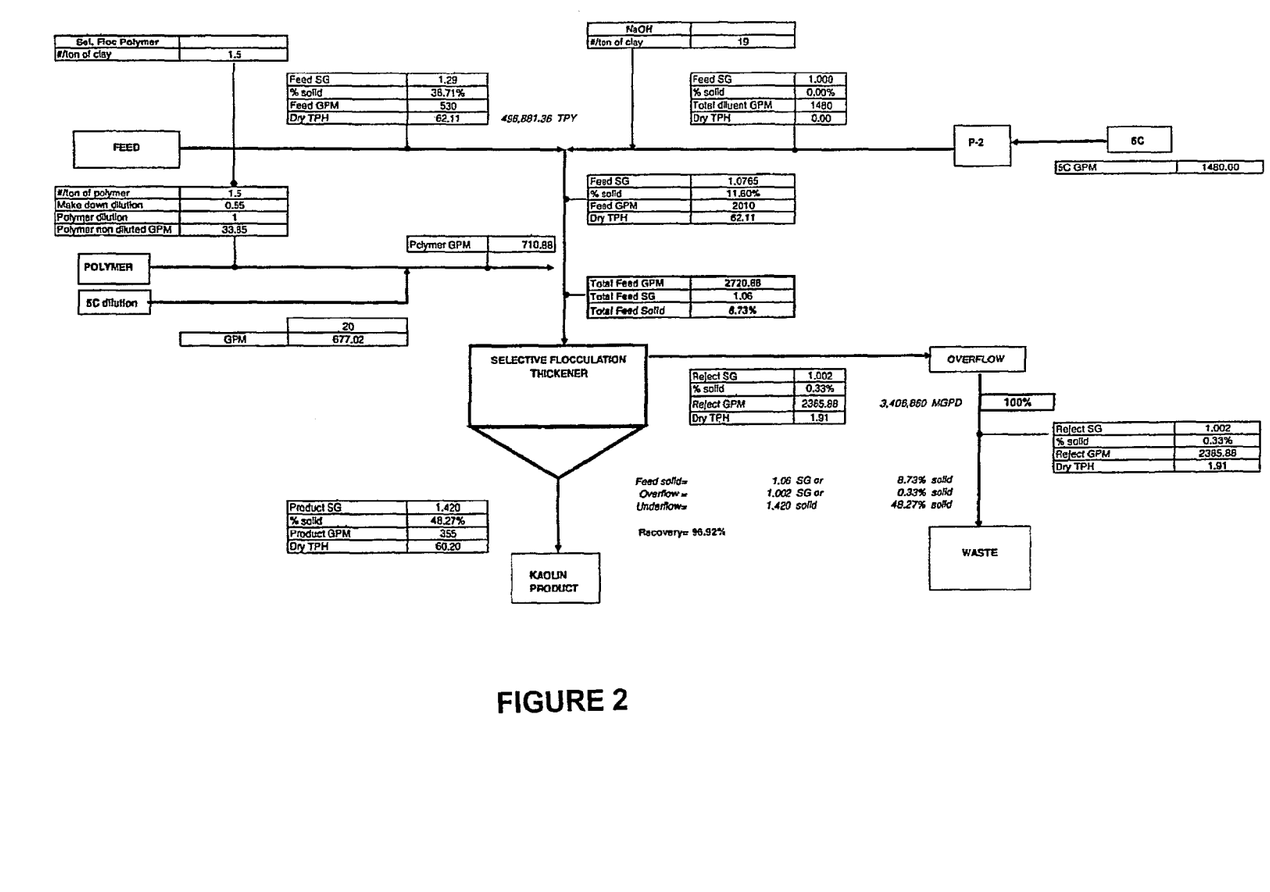
FIG. 2 is a diagrammatic flow sheet illustrating the mass flow balance of a selective flocculation process not including the recirculation aspects of the present invention.
Figure 3:
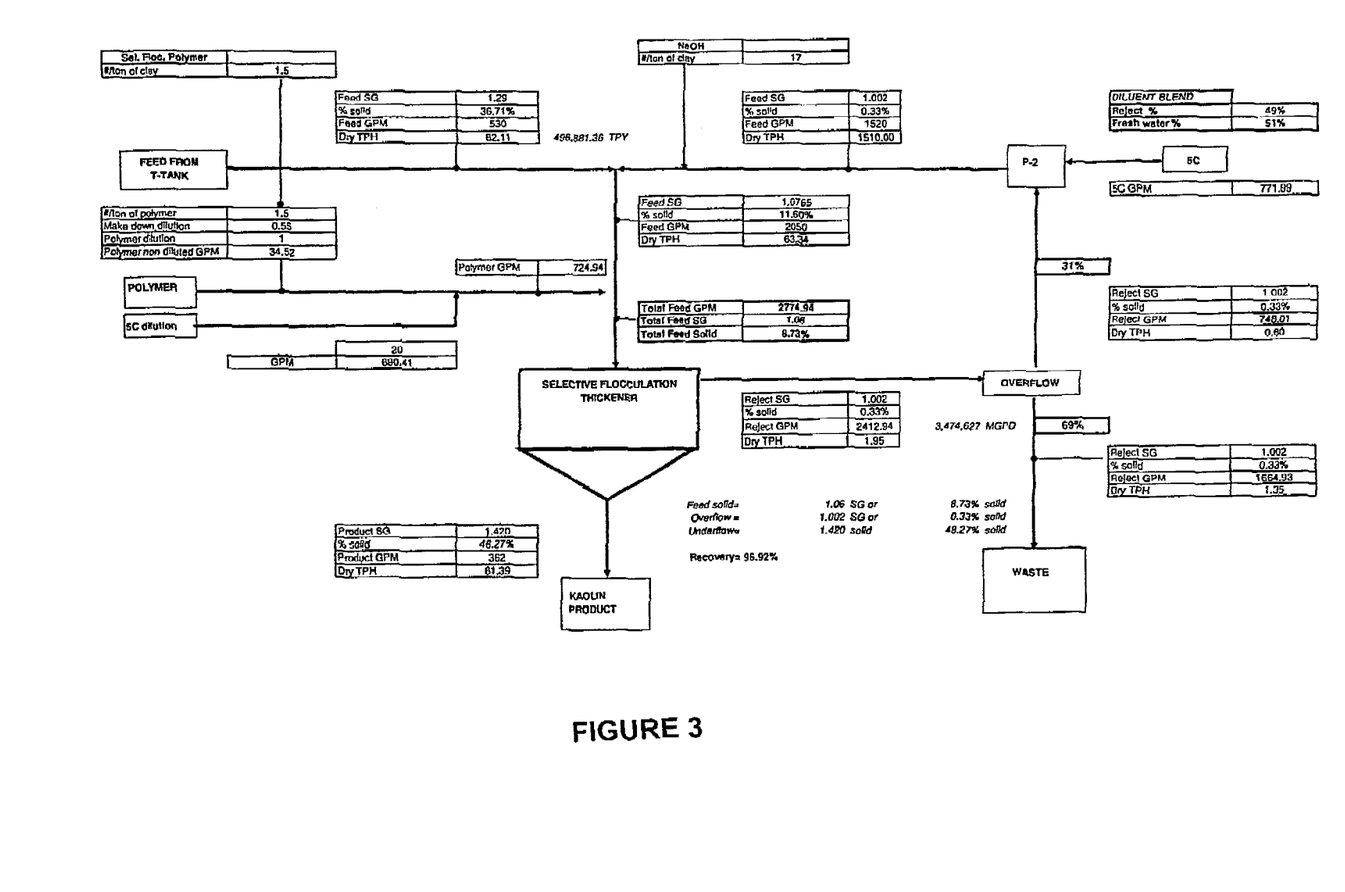
FIG. 3 is a diagrammatic flow sheet illustrating the mass flow balance of a selective flocculation process in accordance with the recirculation aspects of the present invention.

FIG. 2 is a hypothetical example illustrating anticipated results of a selective flocculation process absent the recirculation of the present invention. FIG. 3 is a comparative hypothetical example illustrating the results anticipated when the selective flocculation process of FIG. 2 is supplemented with a recirculation loop in accordance with aspects of the present invention. In the scenario of FIG. 3, approximately 30% of the thickener overflow is recirculated for use as diluent. This is supplemented with an approximately equal mount of fresh water (51% fresh water, 49% recirculated overflow).

In both hypothetical examples, the feed is a crude kaolin slurry having a $TiO_2$ content of about 1.8%, and the desired kaolin product has a final $TiO_2$ content of 1.0%. The feed is assumed to have a solids content of 36.71% and a constant flow rate of 530 gal/min, equating to a throughput of 62.11 tons/hr. pH during selective flocculation is assumed to be 11.5 in each scenario.

As can be seen in the figures, both scenarios achieve comparable quantities of kaolin product. However, the recirculation based approach of FIG. 3 consumes significantly less fresh water (771 gal/min) as opposed to the non-recirculation based approach of FIG. 2 (1480 gal/min). Likewise, the volume of waste produced in the recirculation based approach of FIG. 3 (2365 gal/min) is significantly less than the volume of waste water produced in the non-recirculation based approach of FIG. 2. Thus, it can be seen that the waste stream flowrate of inventive process of FIG. 3 is anticipated be approximately 62.5% of that of the non-recirculating process of FIG. 2.

Figure 4:
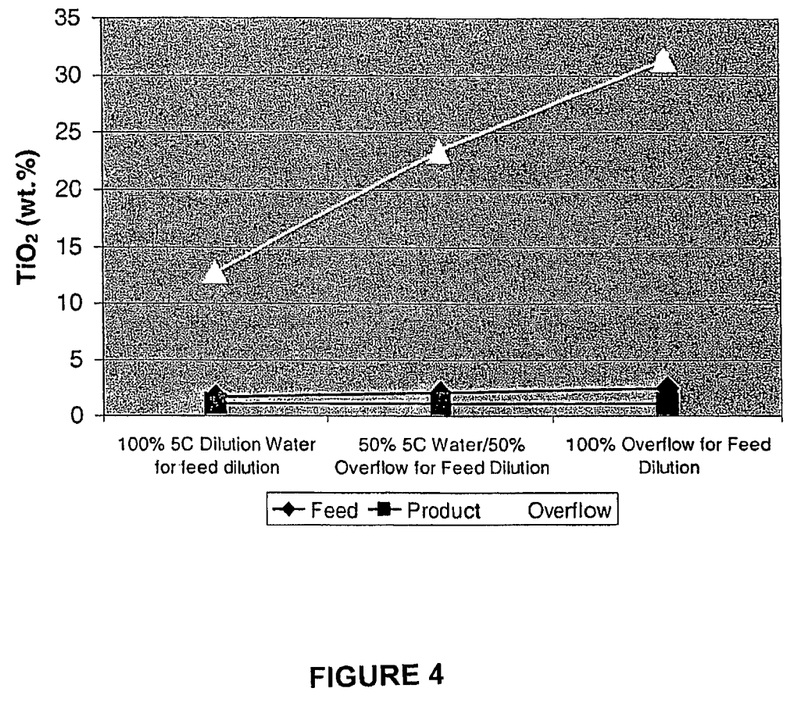
FIG. 4 is a graph showing the anticipated titania concentration in the kaolin product and overflow streams of a hypothetical system in accordance with the present invention at differing recirculation rates.

FIG. 4 is a graph showing the anticipated titania concentration in the kaolin product and overflow streams of a hypothetical system in accordance with the present invention at differing recirculation rates. As can be seen, application of the recirculation aspects of the present invention can result in a significant increase in the titania concentration of the waste stream. In some instances, the titania concentration of the waste stream may exceed 30% by weight, making it an attractive source for the recovery of titania as a secondary product.

Example 1

Figure 5:
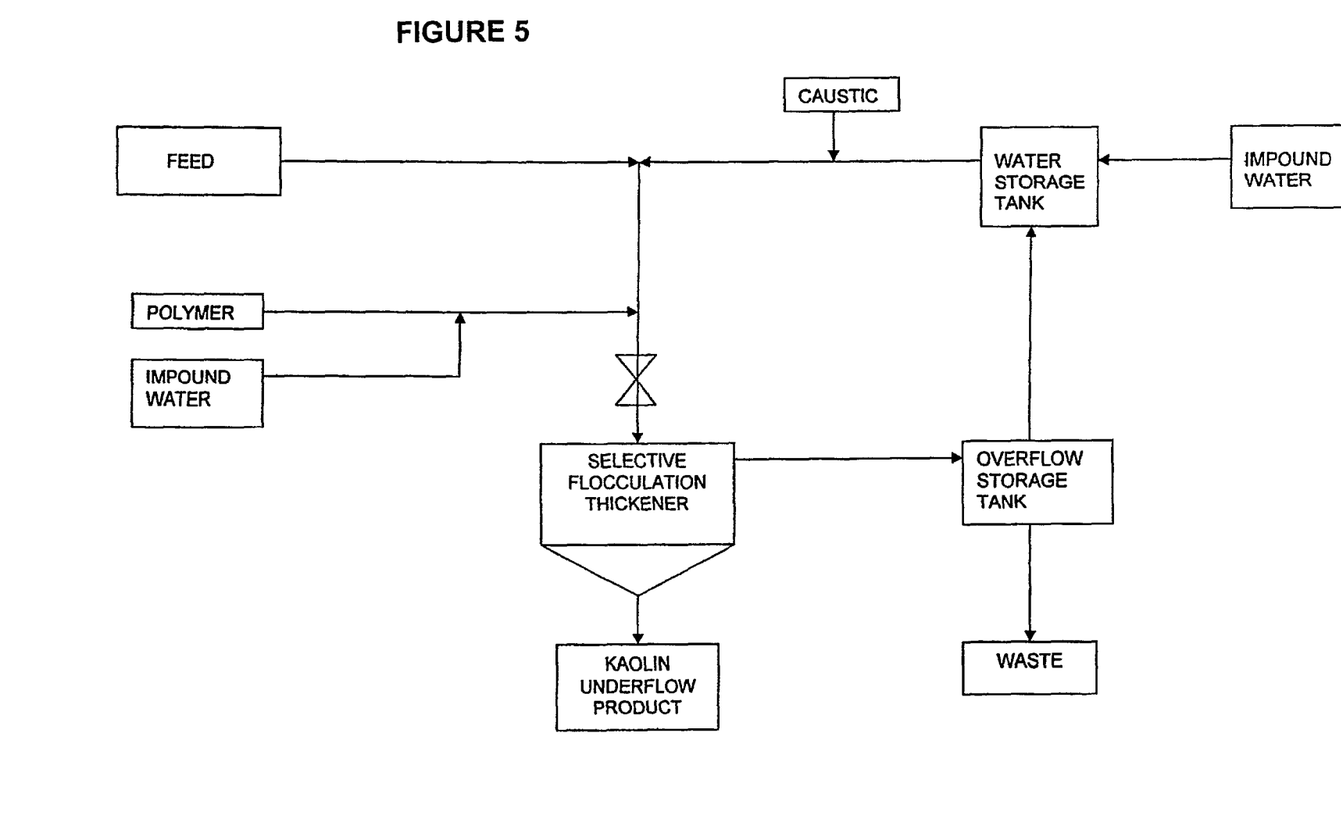
FIG. 5 is a diagrammatic flow sheet of the method described in Example 1.

A method of treating a kaolin particulate material was performed on a pilot scale, as represented in FIG. 5. The Feed shown in FIG. 5 comprised a crude kaolin slurry with the following properties:
  38.6% solids;
  a specific gravity of 1.295;
  a pH of 7.17; and,
  a particle size distribution of:
    91.9% by weight of particles having a size less than 10 µm,
    80.2% having a size less than 5 µm,
    63% having a size less than 2 µm,
    51.9% having a size less than 1 µm,
    38.8% having a size less than 0.5 µm, and
    20.6% having a size less than 0.25 µm.

The Polymer shown in FIG. 5 comprised a 0.021% solution of Hyperfloc® AF-359 purchased from Hychem, Inc. The Impound Water shown in FIG. 5 had a conductivity of 2040 μS/cm and a pH of 5.93. The Caustic shown in FIG. 5 comprised 12.5 lbs/ton active NaOH.

To start the process represented in FIG. 5, the Feed (at a rate of 14.3 gallons/min), Polymer (1.2 lbs/ton at a rate of 4.8 gallons/min), 100% Impound Water from the Water Storage Tank, and Caustic were combined and added to an in-line mixer. That mixture, which had a pH of 11.1, was added to the Selective Flocculation Thickener at a total feed flow rate of 19.1 gallons/min.

From the Selective Flocculation Thickener, the underflow (or "U'flow") comprised the desired purified, flocculated kaolin product while the overflow (or "O'flow") comprised impurities as well as other materials separated by the Thickener. Throughout the procedure, the overflow was collected, generally at a percentage ranging from 45 to 55%, in an overflow storage tank and the remainder of the Thickener overflow was directed to waste.

While at the beginning of the process the Water Storage Tank contained 100% Impound Water, as the process progressed the Overflow Storage Tank accumulated overflow that was mixed with Impound Water in the Water Storage Tank at various ratios that can be calculated from the values shown in Table 1.

Various Feed batches #1-8, which comprised the properties listed in Table 2, were placed in the system at the specified feed flow rates at the noted times. Polymer (at the doses and flow rates over time also listed in Table 2) and the content stored in the Water Storage Tank were added, such that the processes run later in time used recycled overflow from processes run earlier in time.

The Feed batches were prepared as described in Table 1. The composition of the mixture that entered the Selective Flocculation Thickener was analyzed over time (Tables 1 and 2). The mixture flow rate as it entered the Selective Flocculation Thickener over time is also listed in Table 2.

TABLE 1

| Feed Batch # | Targets | start up | 1 | 2 | 3 | 4 | 5 | 6 | 7 | 8 |
|---|---|---|---|---|---|---|---|---|---|---|
| Date | Day 1 | | | | | | Day 2 | | | |
| Time Start (hh:mm) | | −00:30 | 02:15 | 05:00 | 09:40 | 13:45 | 18:30 | 23:45 | 29:15 | 32:15 |
| Overflow Water (gals) | 1264 | none | none | 1263 | 1263 | 1263 | 1263 | 2520 | 1842 | 1842 |
| Feed (gals) | 881 | | | 881 | 881 | 881 | 881 | 881 | 668 | 668 |
| Impound Water (gals) | 1264 | 2528 | 2528 | 1263 | 1263 | 1263 | 1263 | 0 | 0 | 0 |
| pH (initial) | 7.0 | 6.81 | 6.79 | 8.27 | 8.96 | 8.16 | 8.23 | 9.55 | 9.57 | 9.85 |
| Caustic used (lbs) | 49 (4.7 gal) | 51 | 50 | 40 | 39 | 39 | 33 | 30 | 26 | 25 |
| pH (final) | | 11.1 | 11.1 | 11.04 | 10.99 | 10.99 | 10.99 | 11 | 11.01 | 11.01 |
| Time (pumped to Thickener) | | 00:00 | 04:15 | 08:55/ 09:30 | 13:10/ 13:40 | 18:00/ 18:30 | 22:35 | 26:45/ 27:30 | 31:35 | 34:30 |
| % Solids (pan) | 11.4 | 11.9 | | | | | 12.3 | 12.1 | | |
| Specific Gravity | 1.076 | 1.076 | 1.076 | 1.074 | 1.074 | 1.072 | 1.076 | | | |
| Conductivity (mS/cm) | ~2500 | 2600 | 2470 | 2440 | 2480 | 2420 | 2270 | 2320 | 2650 | 2520 |
| Brightness | | 78.01 | 77.86 | 77.39 | 77.49 | 77.08 | 76.18 | 76.18 | 75.73 | 75.73 |
| L-value | | 91.46 | 91.47 | 91.18 | 91.28 | 91.05 | 90.77 | 90.77 | 90.63 | 90.7 |
| a-value | | 0.34 | 0.4 | 0.3 | 0.27 | 0.27 | 0.44 | 0.44 | 0.4 | 0.39 |
| b-value | | 4.88 | 5.01 | 5.1 | 5.16 | 5.19 | 5.33 | 5.33 | 5.51 | 5.62 |
| $TiO_2$ % (XMet) | | 1.724 | 1.741 | 1.922 | 1.909 | 1.949 | 2.431 | 2.431 | 2.459 | 2.489 |
| $Fe_2O_3$ % (XMet) | | 0.528 | 0.502 | 0.519 | 0.501 | 0.494 | 0.516 | 0.516 | 0.525 | 0.508 |
| Calculated lb(NaOH)/Tclay | 7.0 | | | | | | | | | |

TABLE 2

| Approximate Time (hh:mm) | Feed Batch # | Feed pH | Feed Conductivity (mS/cm) | Feed % $TiO_2$ | Feed % $Fe_2O_3$ | Feed Brightness | Feed L | Feed a | Feed b | Feed % Solids (2 hrs) |
|---|---|---|---|---|---|---|---|---|---|---|
| 00:00 | startup | | | | | started feed to thickener | | | | 11.9 |
| 01:30 | | | | | | thickener o'flow | | | | |
| 00:00 | Initial | 11.1 | 2600 | 1.724 | 0.528 | 78.01 | 91.46 | 0.34 | 4.88 | 11.9 |
| 02:15 | | | 2470 | | | | | | | 12.8 |
| 02:45 | | | | | | o'flow sg 1.001 | | | | |
| 02:55 | | | | | | o'flow sg 1.001 | | | | |
| 03:00 | | 11.1 | 2470 | | | reduced polymer dosage | | | | 12.8 |
| 03:45 | | | | | | started O'flow water to T-3 and pumped U'flow to ditch | | | | |
| 04:00 | #1 | 11.1 | 2470 | 1.741 | 0.502 | 77.86 | 91.47 | 0.4 | 5.01 | 12.8 |
| 06:00 | | | | | | | | | | |
| 07:00 | | | | | | o'flow sg 1.0015 | | | | |
| 07:30 | | | | | | | | | | |
| 08:00 | | | | | | | | | | |
| 09:00 | #2 | 10.9 | 2440 | 1.922 | 0.519 | 77.39 | 91.18 | 0.3 | 5.1 | 12.1 |
| 10:00 | | | | | | o'flow sg 1.0015 | | | | |
| 10:30 | | | | | | reduced polymer to 3.9 gpm | | | | |
| 11:15 | | | | | | o'flow sg 1.0015 | | | | |
| 12:30 | | | | | | | | | | 11 |
| 13:00 | | | | | | o'flow sg 1.002 | | | | |
| 14:00 | #3 | 10.86 | 2480 | 1.909 | 0.501 | 77.49 | 91.28 | 0.27 | 5.16 | 11 |

TABLE 2-continued

| Time | | | | | | | | | |
|---|---|---|---|---|---|---|---|---|---|
| 14:30 | | | | o'flow sg 1.002 | | | | | |
| 16:00 | | | | o'flow sg 1.0015 | | | | | 11.3 |
| 17:00 | | | | o'flow sg 1.0015 | | | | | |
| 18:00 | #4 | 10.85 | 2360 | 1.949 | 0.494 | 77.08 | 91.05 | 0.27 | 5.19 | 11.3 |
| 19:30 | | | | o'flow sg 1.0015 | | | | | |
| 20:00 | | | | | | | | | | 11 |
| 20:30 | #5 | 10.82 | 2220 | 2.1 | 0.518 | 77.23 | 91.11 | 0.32 | 5.16 | 11.3 |
| 21:00 | | | | o'flow sg 1.002 | | | | | |
| 22:00 | | | | | | | | | | |
| 23:00 | | | | reduced polymer dosage to .9#/T | | | | | |
| 25:00 | | | | | | | | | | |
| 26:45 | #6 | 10.9 | 2320 | 2.341 | 0.516 | 76.18 | 90.77 | 0.44 | 5.33 | 11.3 |
| 27:00 | | | | | | | | | | |
| 29:00 | | | | | | | | | | 11.3 |
| 31:30 | #7 | 11.03 | 2650 | 2.451 | 0.525 | 75.73 | 90.63 | 0.4 | 5.51 | 11.9 |
| 33:00 | | | | | | | | | | |
| 34:30 | #8 | 10.96 | 2520 | 2.489 | 0.508 | 75.73 | 90.7 | 0.39 | 5.62 | 11.3 |
| 35:00 | | 10.93 | 2480 | | | | | | | |
| 37:00 | | 10.94 | 2470 | | | | | | | 10.1 |

| Approximate Time (hh:mm) | Feed (gpm) (2 hrs) | Floc Dose (lb/T) (2 hrs) | Floc Flow (gpm) (2 hrs) | Thickener Total Feed Flow (gpm) (2 hrs) | Thickener Total Feed Conductivity (mS/cm) (2 hrs) | Thickener Total Feed pH (2 hrs) |
|---|---|---|---|---|---|---|
| 00:00 | 14.3 | 1.2 | 4.8 | 19.1 | | 10.75 |
| 01:30 | | | | | | |
| 00:00 | 14.3 | 1.2 | 4.8 | 19.1 | 2300 | 10.75 |
| 02:15 | 14.2 | 1.1 | 5 | 19.2 | | |
| 02:45 | | | | | | |
| 02:55 | | | | | | |
| 03:00 | 14.2 | 1 | 4.1 | 18.3 | 2400 | 10.73 |
| 03:45 | | | | | | |
| 04:00 | 14.2 | 1 | 4 | 18.2 | 2400 | 10.7 |
| 06:00 | 14.2 | 1 | 4.1 | | 2330 | 10.76 |
| 07:00 | | | | | | |
| 07:30 | 14.3 | 1 | 3.6 | 17.9 | | |
| 08:00 | 14.2 | 1 | 4.1 | 18.3 | 2430 | 10.75 |
| 09:00 | 14.2 | 1 | 4.1 | 18.3 | | |
| 10:00 | 14.1 | 1 | 4.1 | 18.2 | 2350 | 10.83 |
| 10:30 | | | | | | |
| 11:15 | 14.2 | 1 | 3.9 | 18.1 | | 10.75 |
| 12:30 | | | | | | |
| 13:00 | | | | | | |
| 14:00 | 14.2 | 1 | 3.9 | 18.1 | 2100 | 10.65 |
| 14:30 | | | | | | |
| 16:00 | 14.2 | 1 | 3.9 | 18.1 | 2300 | 10.62 |
| 17:00 | 14.2 | 1 | 3.9 | 18.1 | | |
| 18:00 | 14.2 | 1 | 3.9 | 18.1 | 2220 | 10.66 |
| 19:30 | 14.2 | 1 | 3.9 | 18.1 | | |
| 20:00 | 14.1 | 1 | 3.9 | 18.1 | 2280 | 10.81 |
| 20:30 | 14.2 | 1 | 3.9 | 18.1 | 2310 | 10.59 |
| 21:00 | | | | | | |
| 22:00 | | | | | | |
| 23:00 | 14.1 | 0.9 | 3.9 | 18 | 2200 | 10.57 |
| 25:00 | 14.1 | 0.9 | 3.7 | 17.8 | 2170 | 10.58 |
| 26:45 | 14.2 | 0.9 | 3.7 | 17.9 | 2270 | 10.67 |
| 27:00 | | | | | | |
| 29:00 | 14.2 | 0.9 | 3.7 | 17.9 | 2190 | 10.68 |
| 31:30 | 14.2 | 0.9 | 3.7 | 17.9 | 2240 | 10.56 |
| 33:00 | 14.1 | 0.9 | 3.8 | 17.9 | 2450 | 10.8 |
| 34:30 | 14.1 | 0.9 | 3.8 | | | |
| 35:00 | 14.2 | 0.9 | 3.7 | 17.9 | 2280 | 10.79 |
| 37:00 | 14.2 | 0.9 | 3.7 | 17.9 | 2240 | 10.82 |

Samples of the overflow and underflow were analyzed over time and the results are included in Tables 3 and 4. The kaolin underflow product contained less $TiO_2$ and $Fe_2O_3$ and had a greater brightness than the feed batches, as shown in Table 3. As the overflow was recirculated over the introduction of the feed batches, the $TiO_2$ and $Fe_2O_3$ contents of the overflow, as well as the content of other elements and compounds, generally increased over time, as shown in Table 4. Table 4 reflects alternative measurements using both acid flocculation and microwaving.

Table 5 reflects that the Caustic consumption decreased over time because less Caustic was required to achieve the pre-Thickener mixture pH of about 11, due to the pH of the overflow being between 10 and 11 as shown in Table 3. Without overflow recirculation (shown at the time point −00:30 in Table 5), the Caustic consumption was about 50 lbs/ton. Over time, the Caustic consumption was generally reduced to the range of 25-30 lbs/ton with overflow recirculation. There was also a slight reduction in the polymer consumption (from 1 lbs/ton to 0.9 lbs/ton), as shown in Table 2.

The $TiO_2$ content of the pre-Thickener mixture increased from about 1.72-1.74% to about 2.46-2.50% with overflow recirculation, as shown in Table 2. In contrast, the $TiO_2$ content of the kaolin underflow product obtained using recirculated overflow was similar to the kaolin underflow product obtained without using recirculated overflow, as shown in Table 3. That finding indicates that the overflow recirculation method does not have a negative impact on the quality of the kaolin underflow product, as the process with the Selective Flocculation Thickener helps achieve a relatively constant and low $TiO_2$ content in the kaolin underflow product. The results also show that all of the overflow can be recycled, with no Impound Water used (see Table 1), without degrading the purity of the kaolin underflow content.

TABLE 3

| | Overflow | | | | Underflow | | | | | | |
|---|---|---|---|---|---|---|---|---|---|---|---|
| Time (hh:mm) | specific gravity | % solids Calculated | pH | Conductivity (mS/cm) | % solids | % $TiO_2$ | % $Fe_2O_3$ | Brightness | L | a | b |
| 04:00 | 1.002 | 0.7 | 10.71 | 2440 | 51.1 | 1.142 | 0.48 | 80.68 | 92.44 | 0.38 | 4.16 |
| 05:00 | | | | | 50.3 | | | | | | |
| 06:00 | 1.002 | 0.6 | 10.74 | 2400 | 51.7 | 1.096 | 0.464 | 80.59 | 92.34 | 0.35 | 4.20 |
| 07:00 | | | | | 51.5 | | | | | | |
| 08:00 | 1.002 | 0.6 | 10.72 | 2380 | 54.2 | 1.096 | 0.488 | 80.88 | 92.56 | 0.32 | 4.26 |
| 09:00 | | | | | | | | | | | |
| 10:00 | 1.003 | | 10.81 | 2340 | 54.9 | 1.125 | 0.488 | 80.91 | 92.51 | 0.32 | 4.22 |
| 11:00 | | | | | 54.6 | | | | | | |
| 12:00 | 1.002 | | 10.65 | 2370 | | pump off bed low | | | | | |
| 13:00 | 1.002 | | 10.65 | 2240 | 56.2 | 1.045 | 0.48 | 81.34 | 92.71 | 0.31 | 4.15 |
| 14:00 | | | | | 54 | | | | | | |
| 15:00 | 1.001 | | 10.68 | 2060 | 53.9 | 1.043 | 0.454 | 81.02 | 92.54 | 0.29 | 4.16 |
| 16:00 | | | | | | pump off bed low | | | | | |
| 17:00 | 1.001 | | 10.65 | 2260 | 55.7 | 1.062 | 0.466 | 81.07 | 92.55 | 0.32 | 4.14 |
| 18:00 | | | | | 53.6 | | | | | | |
| 19:00 | 1.001 | | 10.65 | 2100 | 53.6 | 1.055 | 0.481 | 81.22 | 92.62 | 0.24 | 4.16 |
| 20:00 | | | | | | pump off bed low | | | | | |
| 21:00 | 1.001 | | 10.66 | 2310 | 54.8 | 1.098 | 0.479 | 80.91 | 92.49 | 0.29 | 4.20 |
| 22:00 | | | | | 53.6 | | | | | | |
| 23:00 | 1.002 | 0.5 | 10.68 | 2220 | 52.7 | 1.103 | 0.466 | 80.88 | 92.56 | 0.33 | 4.14 |
| 24:00 | | | | | 52.4 | | | | | | |
| 25:00 | 1.002 | 0.5 | 10.54 | 2210 | 52.7 | 1.104 | 0.489 | 80.79 | 92.48 | 0.36 | 4.09 |
| 27:00 | 1.002 | 0.5 | 10.52 | 2150 | 51.6 | 1.112 | 0.471 | 80.71 | 92.38 | 0.39 | 4.00 |
| 28:00 | 1.002 | | 10.65 | 2270 | 53.8 | 1.15 | 0.496 | 80.64 | 92.38 | 0.39 | 4.07 |
| 29:00 | 1.002 | | 10.65 | 2270 | 53.8 | 1.15 | 0.496 | 80.64 | 92.38 | 0.39 | 4.07 |
| 30:00 | | | | | 53.8 | | | | | | |
| 31:00 | 1.002 | | 10.61 | 2210 | 52.4 | 1.135 | 0.477 | 80.74 | 92.53 | 0.31 | 4.19 |
| 32:00 | | | | | 52.4 | | | | | | |
| 33:00 | 1.002 | | 10.8 | 2370 | 51.4 | 1.157 | 0.5 | 80.4 | 92.29 | 0.37 | 4.16 |
| 34:00 | | | | | 52.8 | | | | | | |
| 35:00 | 1.002 | | 10.8 | 2260 | 52.5 | 1.115 | 0.441 | 80.55 | 92.39 | 0.39 | 4.18 |
| 36:00 | | | | | 51.8 | | | | | | |
| 37:00 | 1.003 | | 10.8 | 2280 | 50.5 | 1.114 | 0.48 | 80.69 | 92.45 | 0.37 | 4.15 |

TABLE 4

| Sample | $Al_2O_3$ (%) | $K_2O$ (%) | MgO (%) | $SiO_2$ (%) | $Na_2O$ (%) | $Fe_2O_3$ (%) | $TiO_2$ (%) | $P_2O_5$ (%) | CaO (%) | Ba (%) | S (%) | LOI (%) | Total (%) |
|---|---|---|---|---|---|---|---|---|---|---|---|---|---|
| 05:30 Acid Flocced | 34.7 | 0.19 | <0.1 | 38.0 | <0.2 | 0.88 | 12.8 | <0.03 | 0.07 | <0.02 | 0.13 | 12.57 | 99.3 |
| 05:30 Microwaved | 28.6 | 0.18 | <0.1 | 31.2 | 5.39 | 0.70 | 10.0 | <0.05 | 0.69 | <0.05 | 6.14 | 16.54 | 99.4 |
| 21:00 Acid Flocced | 30.3 | 0.26 | <0.1 | 32.3 | <0.3 | 1.11 | 23.5 | 0.586 | 0.07 | <0.1 | 0.13 | 11.35 | 99.6 |
| 21:00 Microwaved | 24.0 | 0.21 | <0.05 | 25.2 | 8.19 | 0.85 | 17.3 | <0.06 | 0.34 | <0.02 | 8.49 | 14.96 | 99.5 |
| 37:30 Acid Flocced | 26.8 | 0.31 | <0.1 | 28.1 | <0.3 | 1.30 | 31.4 | 0.837 | 0.10 | <0.03 | 0.15 | 10.32 | 99.3 |
| 37:30 Microwaved | 21.2 | 0.25 | <0.2 | 22.2 | 9.23 | 1.08 | 24.1 | 3.24 | 0.36 | <0.02 | 4.48 | 13.30 | 99.4 |

TABLE 5

| Caustic Consumption | |
|---|---|
| Time (hh:mm) | 12.5 lbs/ton active NaOH consumed |
| −00:30 | 51 |
| 02:15 | 50 |
| 05:00 | 40 |
| 09:40 | 39 |
| 13:45 | 39 |
| 18:30 | 33 |
| 23:45 | 30 |
| 29:15 | 26 |
| 32:15 | 25 |

We claim:

1. A method of treating a kaolin particulate material to improve one or more of its properties by removal of impurity particles therein which includes:
   (a) producing a dispersed aqueous suspension of a kaolin particulate material containing at least 0.1% by weight, based on the dry weight of the kaolin particulate material, of separable particulate impurity;
   (b) diluting the dispersed aqueous suspension by adding a diluent thereto;
   (c) adding a selective flocculation polymer to the diluted suspension;
   (d) allowing the suspension containing the polymer added in (c) to separate in a selective flocculation separator into layers comprising a flocculated product layer and a deflocculated impurity layer containing the separable impurity; and
   (e) extracting the separated layers from the separator to form a deflocculated impurity layer stream, and
   (f) recirculating at least a portion of the deflocculated impurity layer stream and adding into the dispersed aqueous suspension produced in step (a) without removing the impurities from the deflocculated impurity layer stream.

2. The method of claim 1, wherein the dispersed aqueous suspension has a solids content of at least about 30% by weight.

3. The method of claim 1, wherein diluting the dispersed aqueous suspension comprises adding the diluent to the dispersed aqueous suspension to adjust the solids content of the suspension to from about 5% to about 15% by weight.

4. The method of claim 1, wherein the dispersed aqueous suspension has a solids content of at least about 30% by weight and diluting the dispersed aqueous suspension comprises adding the diluent to the aqueous suspension to adjust the solids content of the suspension to from about 5% to about 20% by weight.

5. The method of claim 1, wherein at least about 5% by weight of the deflocculated impurity layer is recirculated for use as at least a portion of the diluent.

6. The method of claim 5, wherein from about 15% to about 70% by weight of the deflocculated impurity layer is recirculated for use as at least a portion of the diluent.

7. The method of claim 6, wherein from about 30% to about 60% by weight of the deflocculated impurity layer is recirculated for use as at least a portion of the diluent.

8. The method of claim 1, wherein the deflocculated impurity layer has a titania content of at least about 15% by weight solids.

9. The method of claim 8, wherein the deflocculated impurity layer has a titania content of at least about 20% by weight solids.

10. The method of claim 9, wherein the deflocculated impurity layer has a titania content of at least about 25% by weight solids.

11. The method of claim 10, wherein the deflocculated impurity layer has a titania content of at least about 30% by weight solids.

12. The method of claim 1, further including conditioning the diluted suspension prior to adding selective flocculation polymer thereto by allowing the suspension to age for a period of at least 30 minutes and optionally by adding one or more conditioning chemicals thereto.

13. The method of claim 1, further including the step of adjusting the pH of the diluted suspension to be at least about 9.5.

14. The method of claim 3, wherein the pH in steps (d) and (e) is from about 10.5 to about 12.5.

15. The method of claim 1, wherein the separable particulate impurity is titania ($TiO_2$).

16. The method of claim 15, wherein the titania impurity incorporates associated iron oxide impurity.

17. The method of claim 15, wherein the kaolin particulate material contains at least 0.5% by weight of $TiO_2$ separable particulate impurity.

18. The method of claim 17, wherein the amount of $TiO_2$ present in the flocculated product layer is at least 25% less than that present in the kaolin particulate material, the amount of $TiO_2$ in each case being measured as a percentage by weight based on the dry weight of the kaolin particulate material.

19. The method of claim 1, wherein the kaolin particulate material comprises a sedimentary kaolin clay mineral.

20. The method of claim 1, wherein the kaolin particulate material comprises a primary kaolin clay mineral.

21. The method of claim 1, wherein the kaolin particulate material has a washed GE brightness of less than about 70.

22. The method of claim 1, wherein the kaolin particulate material has a washed GE brightness of at least about 70.

23. The method of claim 1, wherein producing the dispersed aqueous suspension is carried out by adding water and a dispersing agent to a substantially dry crude kaolin clay.

24. The method of claim 1, wherein the pH of the dispersed aqueous suspension is adjusted to be at least about 6.5 prior to dilution.

25. The method of claim 12, wherein the optional addition of one or more conditioning chemicals comprises adding a sodium salt to the dispersed aqueous suspension.

26. The method of claim 1, wherein the diluted suspension is heated prior to addition of the selective flocculation polymer to the diluted aqueous suspension.

27. The method of claim 1, wherein the selective flocculation polymer comprises a weakly anionic organic polymer having a molecular weight greater than 100,000.

28. The method of claim 1, wherein the selective flocculation polymer has a molecular weight greater than 1,000,000.

29. The method of claim 1, wherein the total amount of the selective flocculation polymer added is from about 0.01% to about 0.5% on a dry weight basis, based on the dry weight of kaolin in the aqueous suspension.

30. The method of claim 1, wherein the specific gravity of the deflocculated impurity layer is in the range of from about 1.001 to about 1.03.

31. The method of claim 1, wherein, following extraction, the flocculated product layer is redispersed in water and treated by a further selective flocculation process.

32. The method of claim 1, which is carried out as a continuous or semi-continuous process.

33. A deflocculated impurity layer produced by the method of claim 8.

* * * * *